United States Patent [19]
Blue

[11] Patent Number: 5,850,372
[45] Date of Patent: Dec. 15, 1998

[54] METHOD OF ALERTING SEA COWS OF THE DANGER OF APPROACHING MOTOR VESSELS

[75] Inventor: Joseph E. Blue, Orlando, Fla.

[73] Assignee: Leviathan Legacy, Inc., Boca Raton, Fla.

[21] Appl. No.: 12,269

[22] Filed: Jan. 23, 1998

Related U.S. Application Data

[63] Continuation of Ser. No. 717,766, Sep. 23, 1996, abandoned, which is a continuation-in-part of Ser. No. 325,874, Dec. 9, 1994, Pat. No. 5,559,759.

[51] Int. Cl.⁶ .................................................. H04B 1/02
[52] U.S. Cl. ............................................ 367/139; 116/22 A
[58] Field of Search .................................... 367/131, 137, 367/139, 909; 116/22 A; 43/17.1

[56] References Cited

U.S. PATENT DOCUMENTS

| | | | |
|---|---|---|---|
| 4,922,468 | 5/1990 | Menezes | 367/139 |
| 5,142,505 | 8/1992 | Peynaud | 367/103 |
| 5,303,204 | 4/1994 | Wertsberger | 367/99 |
| 5,559,759 | 9/1996 | Gerstein et al. | 367/139 |

FOREIGN PATENT DOCUMENTS

| | | | |
|---|---|---|---|
| 3057791 | 3/1991 | Japan | 367/139 |

OTHER PUBLICATIONS

Twiss, J. R., "Manatee:Endangered Marine Mammal", Water Spectrum, V12, Ni P10(8), 1979.
Dold, C., "Hearing of Manatees May Prove to be key to Protecting Species", N.Y. Times, Sec. C., p. 4, Aug. 25, 1992.

*Primary Examiner*—Ian J. Lobo
*Attorney, Agent, or Firm*—Robert M. Downey, P.A.

[57] ABSTRACT

A method of alerting sea cows to the existence of danger underwater includes generating a modulated acoustical signal in a predetermined source frequency band and sound pressure level and projecting the generated signal underwater in a directional manner and in a direction corresponding with the direction of travel of a motor vessel, wherein the projected modulated acoustical signal has an underwater frequency ranging between 3 kHz and 26 kHz.

10 Claims, 4 Drawing Sheets

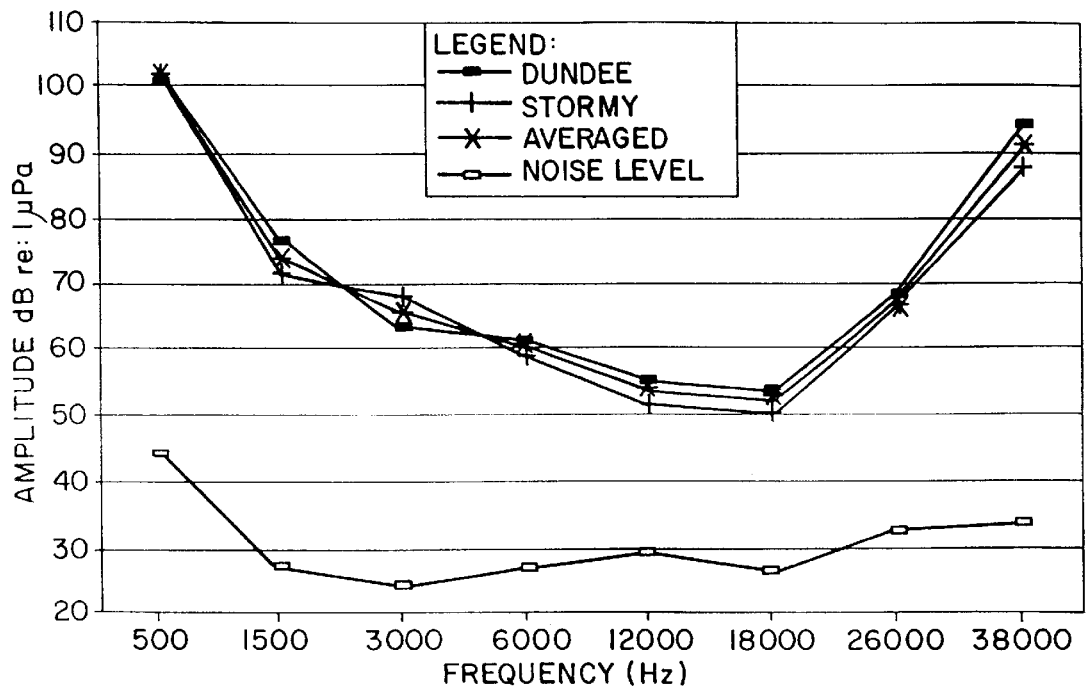
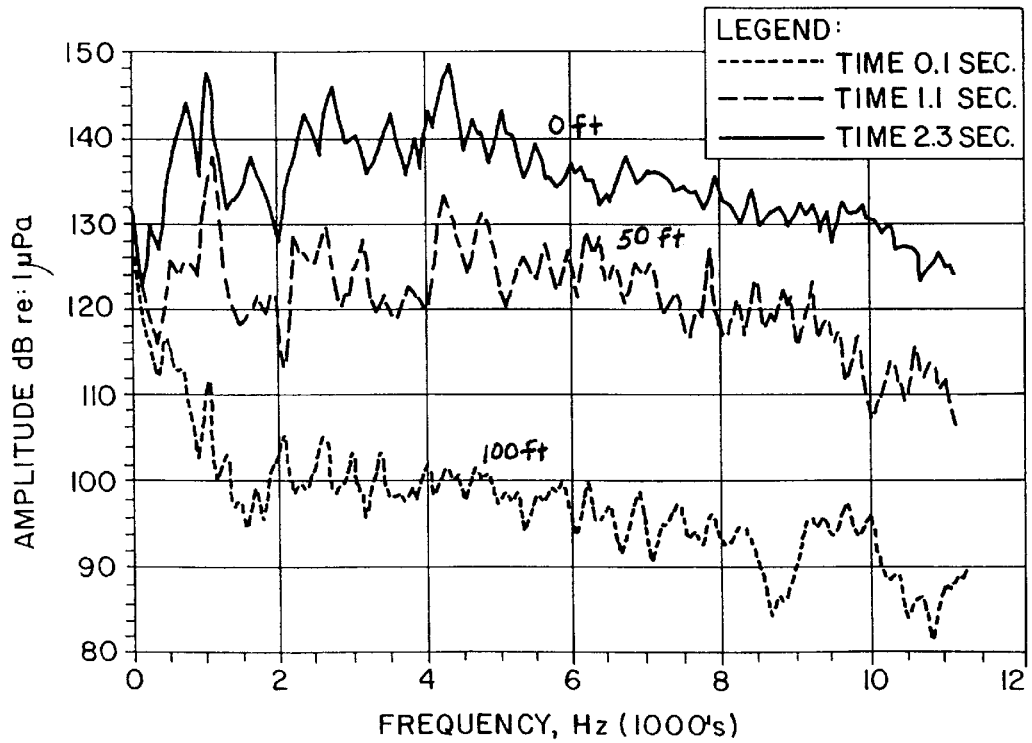

| CRITICAL RATIO (CR'S) | | | | | | |
|---|---|---|---|---|---|---|
| CENTER FREQUENCY (KHz) | RMS VOLTS PER.Rt Hz OF SPECTRUM NOISE 1/3 OCTAVE BANDWIDTH | MASKING NOISE re:1µPa dB | MASKING THRESHOLD re:1µPa dB | CRITICAL RATIO dB | STANDARD DEVIATION | N | DATE |
| .5 | -74.32 | 78.68 | 105.3389 | 26.65 | 2.45789 | 18 | 07/24/94 |
| .5 | -71.08 | 81.92 | 107.7232 | 25.8 | 2.8906 | 14 | 07/23/94 |
| 1.6 | -65.05 | 87.95 | 107.0455 | 19.0955 | 2.49199 | 19 | 07/22/94 |
| 1.6 | -67.97 | 85.03 | 103.9583 | 18.9283 | 2.31863 | 10 | 07/20/94 |
| 1.6 | -75.40 | 77.60 | 97.21429 | 19.61429 | 2.00 | 29 | 07/13,07/19/94 |
| 3. | -68.23 | 84.77 | 97.31282 | 12.54282 | 1.9388 | 28 | 07/07,07/09/94 |
| 3. | -79.33 | 73.67 | 86.64286 | 12.97826 | 2.53144 | 28 | 07/10,07/11/94 |
| 6. | -71.30 | 81.70 | 96.50 | 14.8 | 1.76383 | 21 | 06/29,06/30/94 |
| 6. | -76.20 | 76.80 | 91.31364 | 14.51364 | 2.0537 | 20 | 06/28,07/06/94 |
| 6. | -82.50 | 70.50 | 84.42857 | 13.92857 | 1.54919 | 15 | 07/05,07/06/94 |
| 12. | -70.38 | 82.62 | 111.3333 | 28.7133 | 2.11302 | 16 | 07/27/94 |
| 12. | -85.43 | 67.57 | 93.77778 | 26.20778 | 2.84421 | 17 | 07/24/94 |
| 18. | -77.38 | 65.62 | 99.375 | 23.755 | 2.78107 | 16 | 07/31/94 |
| 18. | -86.32 | 66.68 | 82.825 | 16.195 | 2.195715 | 14 | 07/29/94 |

FIG. 3

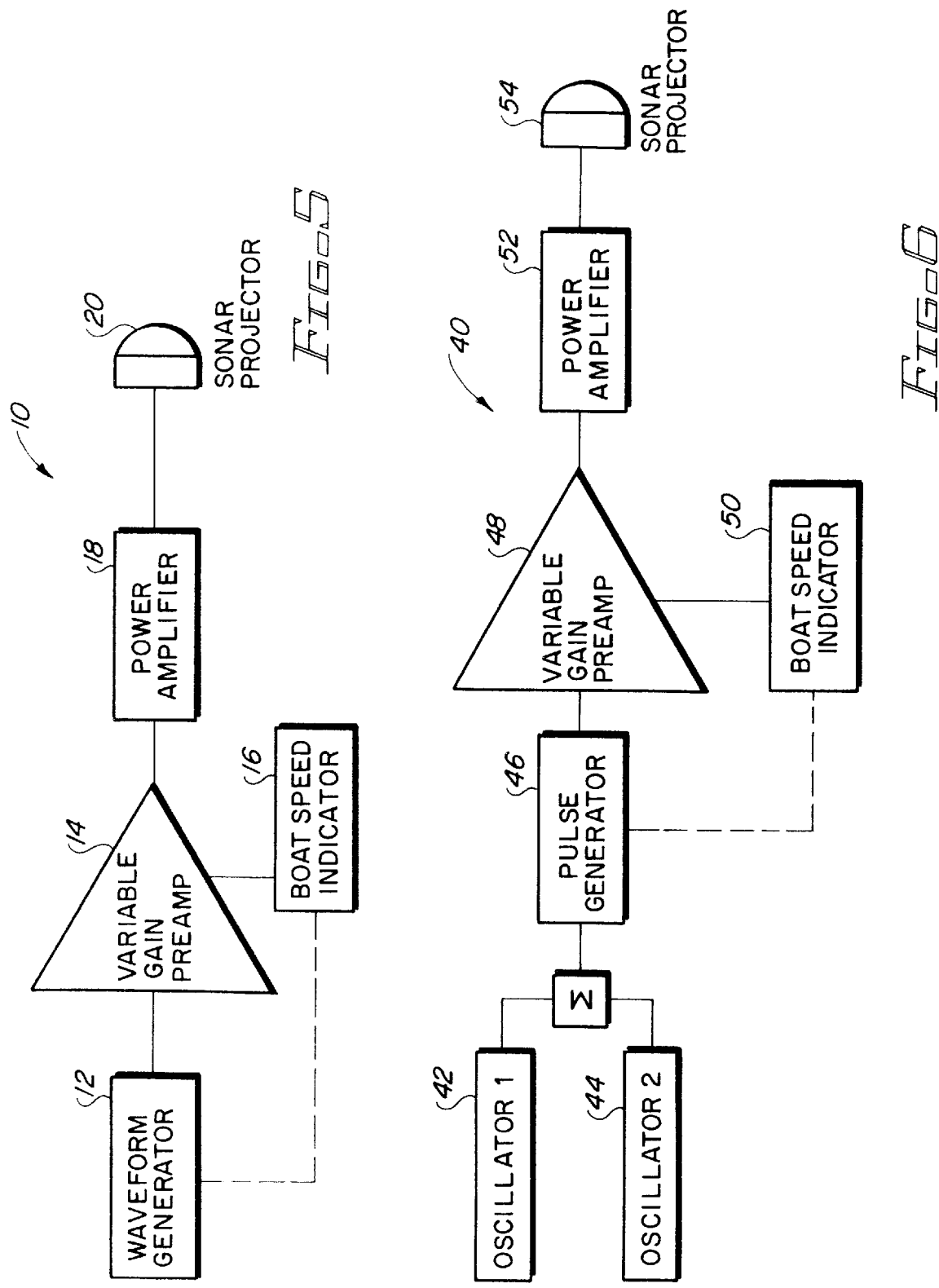

METHOD OF ALERTING SEA COWS OF THE DANGER OF APPROACHING MOTOR VESSELS

BACKGROUND OF THE INVENTION

This application is a continuation application of patent application Ser. No. 08/717,766 filed in the U.S. Patent Office on Sep. 23, 1996, to be subsequently abandoned, which was a continuation-in-part application of Ser. No. 08/352,874, filed Dec. 9, 1994, now U.S. Pat. No. 5,559,759 issued on Sep. 24, 1996.

FIELD OF THE INVENTION

The present invention relates to a means of providing directional acoustic cues to sea cows underwater and, more particularly, to a method of alerting sea cows underwater to the danger of approaching motor vessels by projecting directional pulsed acoustic signals underwater within a predetermined frequency range.

DESCRIPTION OF THE RELATED ART

It is widely known, as evidenced by the article by John R. Twiss, Jr., that the danger of being struck and run over by motor boats presents one of the greatest threats to sea cows. Twiss, J. R., "Manatee: Endangered Marine Mammal", Water Spectrum, Winter 1979, 80, V.12, N1, p. 10 (8). Sea cows have limited auditory perception in the range of boat noise frequencies, but good reaction abilities underwater. Their limited perception makes it difficult to detect the presence and directional movement of an approaching motor boat in sufficient time to take evasive action even with their good reaction capability. It is therefore not surprising that one of the leading human related causes of death for the endangered sea cow is collision with boats. Prior to the development of the present invention, the inability of sea cows to avoid collisions with boats was a mystery and not attributed to the sea cow's hearing and the problems associated with hearing boat noise in shallow water or near the water's surface. Until the development of the present invention, the only prior method offered for reducing boat collisions with sea cows was to impose restrictive speed limits on boats operating in sea cow habitats. However, sea cows still cannot effectively hear and localize the sounds of an approaching boat and are still at risk if a boat is going fast or slow.

It is generally known that fish react to certain acoustical signals underwater, and thus various systems and methods for controlling fish behavior have been developed in the related art. Some of these systems are designed to elicit attraction or repulsion behavioral responses in fish. Examples of these types of systems are disclosed in the Kowalewski, U.S. Pat. No. 4,646,276 and E. L. Pipkin, et al., U.S. Pat. No. 3,538,493. Still other methods using sounds projected underwater are designed to modify fish behavior in a manner causing them to swim along a desired path, as disclosed in the Suomala, U.S. Pat. No. 4,932,007. While the various systems and methods in the related art have been found to be useful for intended purpose, namely controlling fish behavior, they are not suitable for use to alert sea cows underwater of impending danger. Specifically, the fish behavioral control systems known in the related art generally operate at frequencies below 1 kHz, which is too low to be audible to sea cows underwater, in their usual near surface marine environment. Further, none of the systems known in the prior art are designed to project a directional pulsed acoustical signal underwater and in the direction of movement of a motor vessel within a frequency range audible to sea cow's underwater and near the water surface so that sea cows along the path of travel of the vessel will be alerted to the danger and thus be prompted to take early evasive action.

Other sound projecting systems which effect marine mammals have been proposed in the related art. Specifically, the Japanese patent to Masashi, Japanese Patent No. 3-57791, discloses equipment for preventing impact of a hydrofoil craft with dolphins and whales. Masashi teaches that generating an ultrasonic wave having a significant sonic pressure below 1 kHz can repel dolphins. The purpose of the Masashi device is to irritate marine mammals, by projecting annoying ultrasonic signals which are potentially harmful to marine mammals. This has the effect of driving marine mammals out of an area in order to clear a path for an approaching hydrofoil craft. The Masashi device requires sound pressure levels of 120–130 dB at 100 meter distances corresponding to a source level of 160–170 dB re: 1 $\mu$Pa at one (1) meter. These levels are 110–120 dB above the hearing threshold of sea cows at 16 kHz, and could damage the sea cow's hearing and cause significant associated pain and injury.

Another underwater sound projecting system is found in the U.S. patent to Menezes, U.S. Pat. No. 4,922,468. Menezes discloses a method and apparatus for controlling the population of marine and aquatic species in an area of water. The Menezes method includes the development of data concerning the response of various species to stimuli in different environmental conditions, and the generation of stimuli in the control area to affect the species in that area and, thus, control the population. While Menezes discusses how different frequencies are needed for different species, there is no specific disclosure of any definite values for audible frequency ranges associated with any particular species. Menezes suggests that one using his system can learn what the values for specific species are over a period of time. The Menezes system relies on feedback from monitoring the movements and reactions of different animals which come into a specific site. Essentially, this system is a fixed research laboratory for collecting data concerning the response of various species to stimuli in different environmental conditions, and a method of collecting this data using the Menezes apparatus.

In spite of the various developments and proposed methods and apparatus in the related art, there still exists a need for a method of alerting sea cow to possible dangers underwater using acoustic cues which the sea cow can effectively discern, discriminate and localize so that sea cows can take early action to avoid the danger.

SUMMARY OF THE INVENTION

The present invention is directed to a method of alerting sea cows underwater of the danger of approaching motor boats, using a linear or parametric sonar projecting device. In accordance with the method of the present invention, the sonar projecting device generates a pulsed acoustical signal having a predetermined source frequency band and either a fixed or a variable sound pressure level. The generated signal is projected underwater from a motor vessel. In order to be audible to a sea cow near the water surface, the acoustical signal must have an underwater frequency ranging between 3 kHz and 26 kHz. In one embodiment, using linear sonar, the acoustical signals are projected directly in the frequency range of 3 kHz to 26 kHz. In another embodiment, using a nonlinear or parametric sonar device, the underwater frequency range is created by the non-linearity of the water. In this particular instance, the non-linear or parametric sonar device emits two or more high frequency sounds with the difference in frequency being the resultant underwater frequency in the 3 kHz to 26 kHz range. In either instance, the signal will not cause the sea cow any discomfort, nor will it physically drive the animal out of an area. The pulsed rate of the signal can either be varied between 2 pulses per second to 25 pulses per second or modulated in other ways to make it more audible to sea cows. By using the waveforms, sea cows are able to learn to associate the noise with the danger of the approaching boats. This enables sea cows to localize the danger in sufficient time to take evasive action and avoid the danger without experiencing discomfort.

With the foregoing in mind, it is a primary object of the present invention to provide a method of alerting sea cows underwater to the danger of approaching motor vessels, so that they can have sufficient warning to take evasive action.

It is a further object of the present invention to provide a method of alerting sea cows underwater to the existence of danger by generating directional pulsed acoustical signals within a frequency range which is audible to sea cows underwater, taking into consideration the background noise spectrum in a marine environment and the Lloyd Mirror Effect (surface reflection of sound near the air/water interface).

It is another object of the present invention to provide a method of alerting sea cows to the existence of danger by providing the animal with acoustic cues which it can effectively discern, discriminate and localize, so that the sea cow will have sufficient warning to take evasive action.

It is another object of the present invention to provide a method of alerting sea cows to the existence of danger underwater by providing the animal with acoustic cues which it can effectively discern, discriminate and localize, and wherein the acoustic cues are environmentally friendly so that they do not cause the animal physical discomfort and, further, so that they do not physically force the sea cow to leave an area due to physical discomfort, irritation or pain.

It is a further object of the present invention to provide a method of alerting sea cows to the dangers of approaching motor vessels by providing the animal with acoustic cues which it can effectively discern, discriminate and localize so that the sea cows can recognize that a boat is approaching and take early evasive action.

It is still a further object of the present invention to provide a method of alerting sea cows underwater to the dangers of approaching motor vessels by projecting directional acoustical signals in the direction of travel of a motor vessel within a frequency range of 3 kHz to 26 kHz.

It is yet a further object of the present invention to provide a method of alerting sea cows underwater to the danger of approaching motor vessels using a linear sonar projecting system adapted to project directional pulsed acoustical signals underwater in a direction of travel of the motor vessel within a frequency range of 3 kHz and 26 kHz.

It is still a further object of the present invention to provide a method of alerting sea cows underwater to the danger of approaching motor vessels by projecting two or more high frequency sounds to create a difference in frequencies in the frequency range of 3 kHz to 26 kHz due to the non-linearity of water.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which:

FIG. 1 is an audiogram showing the sea cow's hearing threshold underwater.

FIG. 2 is a chart illustrating a spectrum of noise from a motor boat measured underwater.

FIG. 3 is a table setting forth critical ratios for sea cow underwater hearing perception, taking into account masked threshold levels and masking noise.

FIG. 5 is a schematic diagram of a linear sonar projecting system used in connection with the method of the present invention.

FIG. 6 is a schematic diagram of a parametric sonar projecting system used in connection with the method of the present invention.

Like reference numerals refer to like parts in FIGS. 5 and 6.

DETAILED DESCRIPTION OF THE PREFERRED EMBODIMENTS

Figure 4A:
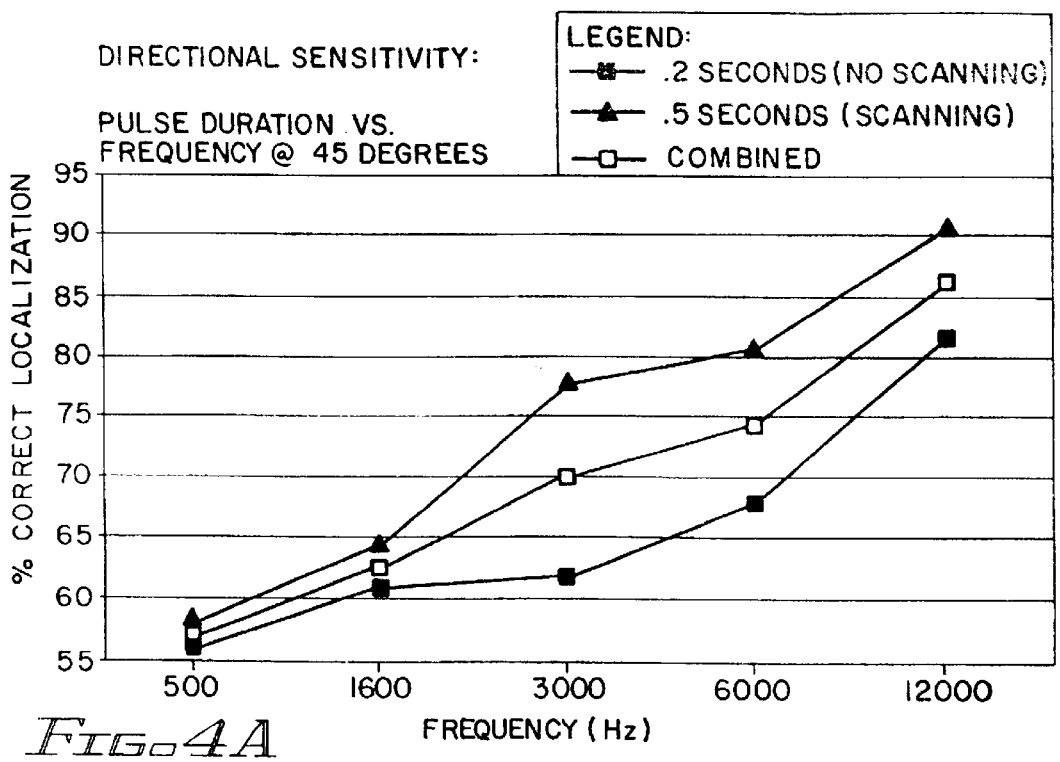
FIGS. 4A and 4B are charts illustrating directional hearing ability of the sea cow underwater measured at angles of 45 degrees and 95 degrees respectively.

The present invention is directed to a method of alerting sea cows underwater to the danger of approaching motor vessels using linear or parametric sonar projecting devices to generate and project a directional acoustical signal underwater from a motor boat.

In order to derive the specific information necessary to design an effective device for alerting a sea cow to the danger of an approaching motorized vessel, in accordance with the method of the present invention, it is necessary to have knowledge of the following:

1. A sea cow audiogram which is a graph of the sea cow's hearing threshold as a function of frequency;
2. The directional hearing ability of the sea cow as a function of frequency;
3. The ability of a sea cow to hear signals in background noise;
4. The rate at which a sea cow can move;
5. The frequency spectrum of motor boat noise;
6. The background noise spectrum in sea cow habitats;
7. The physics of sound propagation in sea cow habitats, particularly near the air/water interface (surface).

The required knowledge of items 1–3 above was not known until extensive research efforts to measure the sea cow's hearing abilities were performed. Using knowledge from these seven areas, it became readily apparent why sea cows are repeatedly run over by motor boats. Further, having knowledge of the above items, the inventor hereof set forth to develop an effective device to alert sea cows far enough in advance of the arrival of a boat or nearby hazard so that a sea cow will have sufficient time to take evasive action.

The sea cow's threshold of hearing is depicted in FIG. 1 by the audiogram that was measured through an extensive research effort. This shows that sea cow's do not hear low frequencies well, but hear best at around 16 kHz. Below 1 kHz, the sound pressure level has to exceed 90 dB re 1 $\mu$Pa for sea cows to hear a pure tone. FIG. 2 shows the power spectrum for a motor boat at a speed of about 30 mph about 100 ft. from a hydrophone mounted at a mid-depth in 10 ft. of water. By overlaying FIGS. 1 and 2, I have concluded that sea cows could hear a motor boat traveling at 30 mph at 100 ft. distance at a mid-depth of 5 ft. However, it is well known that sea cows do not get run over by boats when they are at depths of 5 ft. or more, but get hit when very close to the surface. Due to the Lloyd Mirror Effect, it is more difficult to detect sound pressure near the air/water interface since sound pressure is near zero in this area for low frequencies. The frequencies below some predetermined cutoff frequency do not propagate near the surface to any large degree. In 10 ft. of water, where the motor boat power spectra was obtained, the cutoff frequency is about 1 kHz.

In FIG. 2, the power seen below 1 kHz is primarily ambient noise. The boat's motor turning at 4000 rpm should have noise primarily around harmonics of 67 Hz associated with shaft and blade rates and harmonics thereof in deep water. What is seen in FIG. 2 is the broadband cavitation noise that is above the 1 kHz cutoff frequency. This noise level of 100 dB re 1 $\mu$Pa is about 20–30 dB above the sea cow's hearing threshold, so that the sea cows could hear this noise under quiet ambient conditions such as existed where the audiogram was made. Unfortunately, sea cow habitats do not necessarily have the low ambient noise levels found at the quiet site where the audiogram was measured.

Figure 4B:
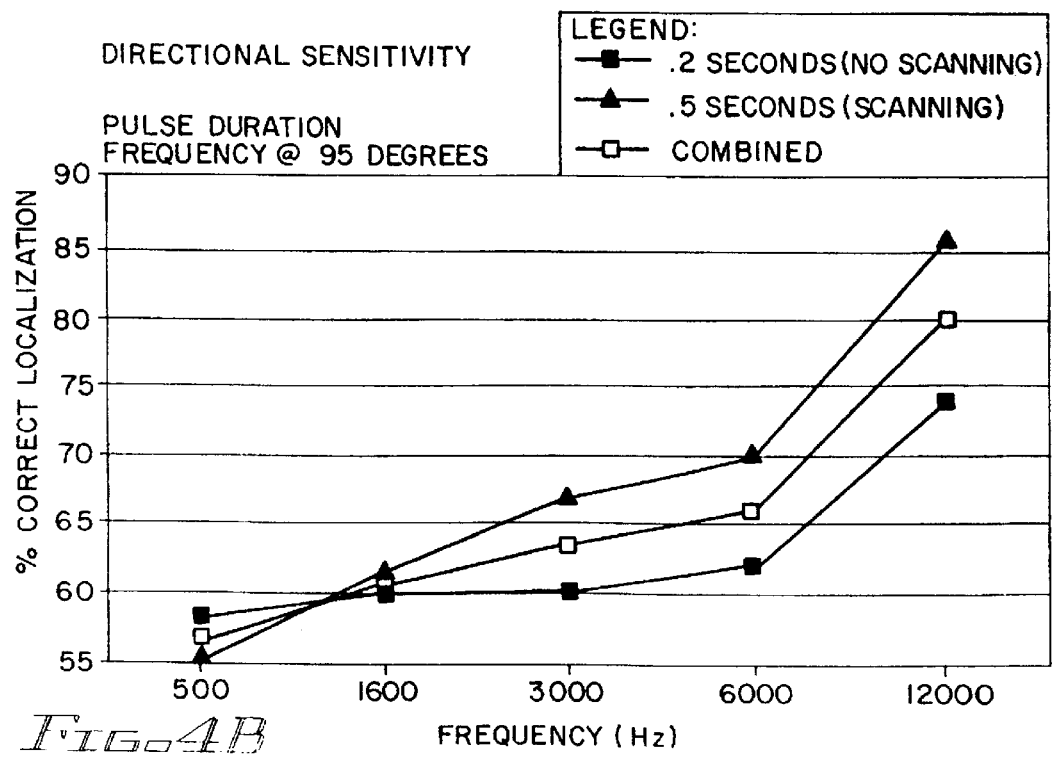

To understand how well sea cows hear in a noisy background, we turn to the masking studies. FIG. 3 illustrates the masked thresholds for a sea cow, showing the critical ratios being less in the sea cow's vocalization range than one would expect. In the 15 kHz region, continuous wave signals must be approximately 27 dB above background noise to be heard. Thus, for sea cows to hear a boat at a range of 175 ft., the sound pressure must be approximately 107 dB if the masking level is 80 dB, which has been measured in areas with heavy boat traffic. To generate the required 107 dB at a 175 ft. range, a source level of about 142 dB is required. Lower levels will be required with modulated signals which are more readily detectable to sea cows in a noise background. In accordance with the present invention, it is preferable that an alarm sound be generated and projected from a boat in a directional and pointed manner, above the measured critical ratios set forth in FIG. 3, and in a direction corresponding with the direction of travel of the boat. The alarm signal should not be continuous waves tones, since pulsed signals have been determined to be more readily detectable (both directionally and distinguished from normal background noise) than continuous wave tones. Referring to FIGS. 4A and 4B, it is seen that sea cows have very good directional discrimination capabilities above 10 kHz. Thus, sea cows will go through a learning process to be able to better distinguish and associate normal noise from a potential danger. Through the course of the extensive studies and experiments, sea cows have demonstrated the cognitive ability to make such learned discriminations and paired associations.

FIG. 5 is a schematic diagram of a linear sonar transmitting system that can be used in connection with the method of the present invention. The linear sonar transmitting system, generally indicated as 10, consists of a waveform generator 12, a variable gain amplifier 14, or alternating a fixed gain preamplifier, a power amplifier 18 and a sonar projector 20. The waveform generator 12 is a simple oscillator set to generate, for example, 50 msec pulses of 15 kHz center frequency at a rate of 10 times per second. The sonar projector has a 3 dB horizontal beam width of 12 degrees to give a width of 35 ft. at a range of 175 ft. To provide this width at 15 kHz, the projector must be about 20 inches wide.

For a vertical beam width of 30 degrees, the height of the transducer must be about 4 inches. Such a large projector may produce an unacceptable hydrodynamic drag on a small boat.

Alternatively, referring to FIG. 6, there is shown a schematic diagram illustrating a parametric sonar project system (nonlinear) that might be preferable to that of the linear system. The parametric sonar projecting system, generally indicated as 40, includes two oscillators including a first oscillator 42 and a second oscillator 44 set at 145 kHz and 160 kHz respectively. One of these oscillators can be replaced by a function generator to produce more complex waveforms. The generated frequencies of the two oscillators are summed and the summed output is pulsed by the pulse generator 46 at 50 msec pulse widths. The pulsed voltages are fed into a variable gain preamplifier 48, or alternatively a fixed gain preamplifier. The voltages are then fed into a power amplifier 52, and then to a sonar projector 54. The sonar projector 54 creates summed pulsed pressure signals in the water at frequencies centered around 145 kHz and 160 kHz. The nonlinear properties of the media (water) creates 15 kHz pulsed signals in the water. The beam width of these different frequency pulses is about the same as beam width of the primary frequencies. To create a beam width of 6 degrees at 150 kHz, a circular piston projector can be used that is about 4 inches in diameter. To achieve an equivalent 142 dB pressure level at 15 kHz underwater, a source level of about 193 dB at 150 kHz is required, to give a 100 dB SPL at 175 ft. Because of the endfire effect due to water nonlinearity, the maximum sound pressure at 15 kHz would be only 110 dB and would occur between 10–15 meters. At a 175 ft. range a width of 17.5 feet would be insonified at the 3 dB down points. Higher primary frequencies can be used to allow operation above the known hearing range of all marine mammals.

While the invention has been shown and described in what is considered to be practical and preferred embodiments thereof, it is recognized that departures may be made within the spirit and scope of the following claims which, therefore, should not be limited except within the Doctrine of Equivalents.

Now that the invention has been described,

What is claimed is:

1. A method of alerting sea cows underwater to the danger of approaching motor vessels, comprising the steps of:
    generating a modulated signal,
    transforming said modulated signal into a modulated acoustical signal, and
    projecting said modulated acoustical signal in a directional manner underwater from a motor boat in a direction corresponding with a direction of movement of the motor vessel, said projected modulated acoustical signal resulting in an underwater acoustical signal having a frequency ranging between 3 kHz and 26 kHz.

2. The method as set forth in claim 1 further comprising the step of amplifying said modulated signal to a predetermined level prior to projecting said modulated acoustical signal underwater.

3. The method as set forth in claim 1 wherein said projected modulated acoustical signal has a beam width between 2° and 18°.

4. The method as set forth in claim 3 wherein said modulated acoustical signal is modulated at a rate of between 2 and 25 times per second.

5. The method as set forth in claim 4 wherein said steps of: generating a modulated signal; transforming said modulated signal into a modulated acoustical signal; and projecting said modulated acoustical signal are carried out by a linear sonar projecting device.

6. The method as set forth in claim 5 wherein said linear sonar projecting device includes:
- a waveform generator for generating the modulated signal,
- a variable gain preamplifier,
- a power amplifier for amplifying the generated modulated signal, and
- a sonar projector for projecting the amplified modulated acoustical signal underwater in a directional manner.

7. The method as set forth in claim 4 wherein said steps of: generating a modulated signal; transforming said modulated signal into a modulated acoustical signal; and projecting said modulated acoustical signal are carried out by a nonlinear sonar projecting device.

8. The method as set forth in claim 7 wherein said nonlinear sonar projecting device is a parametric sonar projecting device comprising:
- signal generating and modulation means for generating a plurality of signals of different frequencies and summing the frequencies,
- a pulse generator for creating a pulse in said plurality of signals,
- a variable gain amplifier,
- a power amplifier for amplifying the pulsed plurality of signals, and
- a sonar projector for creating and projecting summed pulsed signals from the summed frequencies of the amplified pulsed signals underwater in a directional manner, wherein the nonlinear properties of water create the underwater frequency within the 3 kHz to 26 kHz range.

9. A method of alerting sea cows underwater to potential dangers, comprising the steps of:
- generating a pulsed signal,
- transforming said pulsed signal into a pulsed acoustical signal, and
- projecting said pulsed acoustical signal in a directional manner underwater, said projected acoustical signal resulting in an underwater acoustical signal having a frequency ranging between 3 kHz and 26 kHz.

10. A method of alerting sea cows to the danger of approaching motor vessels, comprising the steps of:
- generating a pulsed signal at a rate of between 2 and 25 times per second,
- transforming said pulsed signal into a pulsed acoustical signal, and
- projecting said pulsed acoustical signal in a directional manner underwater from a motor vessel in a direction corresponding with a direction of movement of the motor vessel, said projected pulsed acoustical signal having a beam width between 2° and 18° and resulting in an underwater acoustical signal having a frequency ranging between 3 kHz and 26 kHz, wherein said projected pulsed acoustical signal is audible to sea cows underwater up to a range that allows sea cows a predetermined amount of time to hear and avoid collision with the motor vessel.

* * * * *